A. C. ROESSLER & W. A. ARMINGTON.
COMBINED HIGH AND LOW PRESSURE GAS LAMP.
APPLICATION FILED JUNE 5, 1911.
1,043,464.
Patented Nov. 5, 1912.
2 SHEETS—SHEET 2.
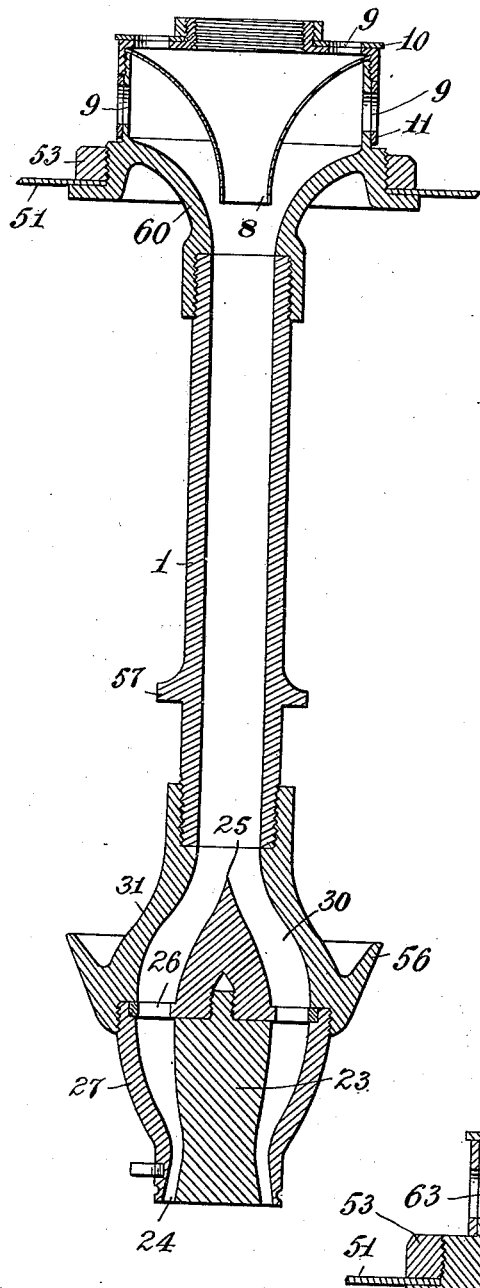
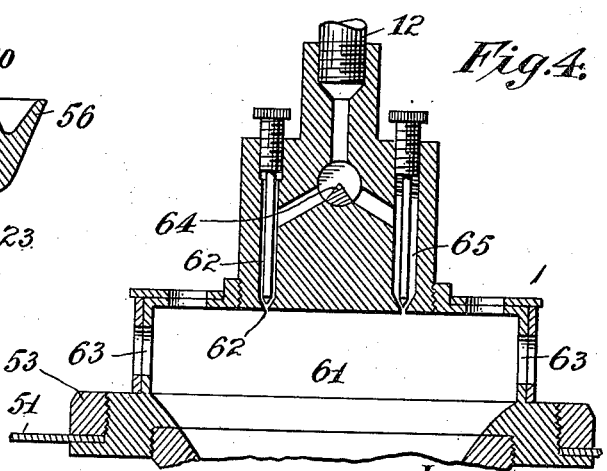

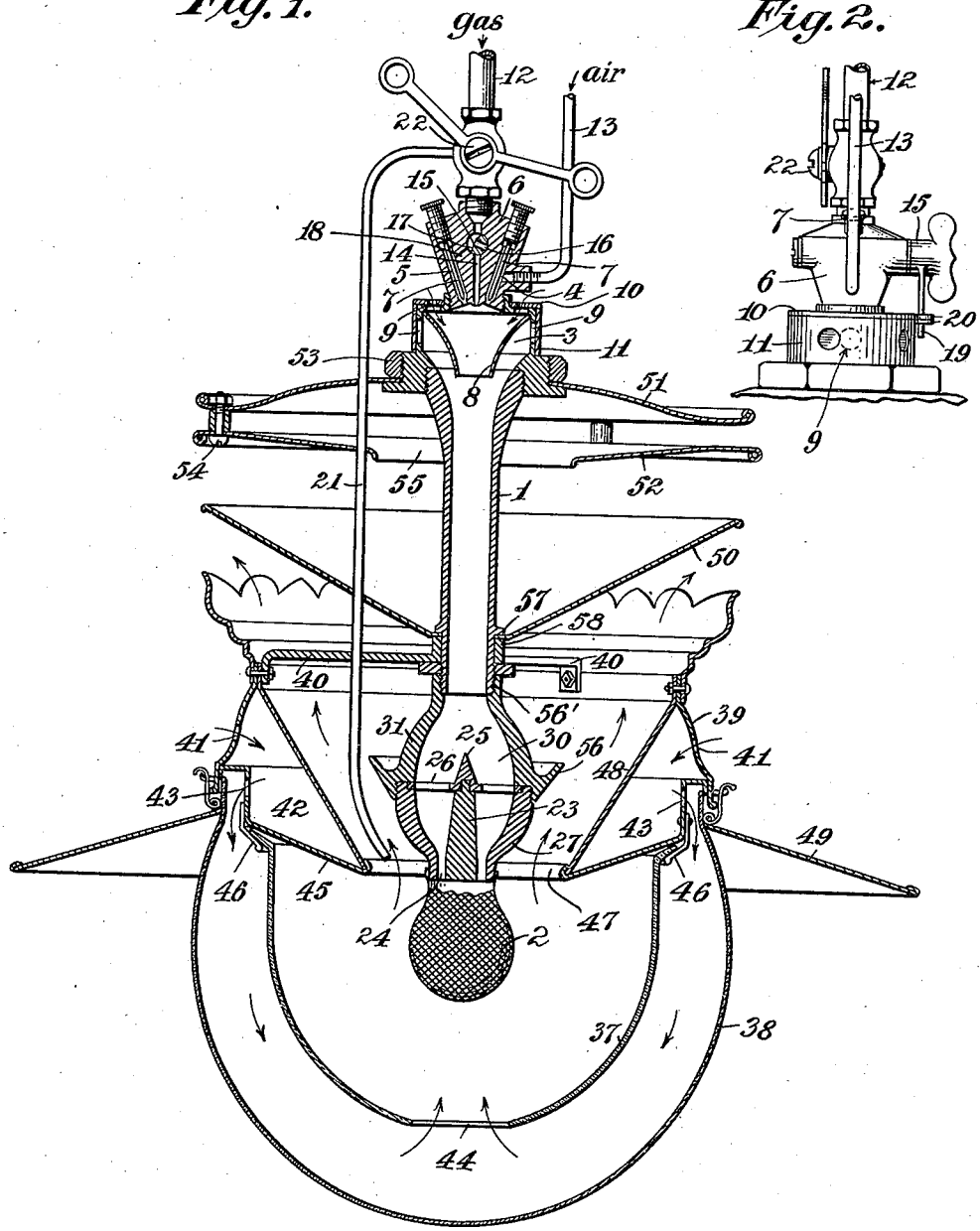

UNITED STATES PATENT OFFICE.

AMANDUS C. ROESSLER, OF MINEOLA, AND WILLIAM A. ARMINGTON, OF NEW YORK, N. Y., ASSIGNORS, BY DIRECT AND MESNE ASSIGNMENTS, TO DELAWARE GAS LIGHT COMPANY, A CORPORATION OF DELAWARE.

COMBINED HIGH AND LOW PRESSURE GAS-LAMP.

1,043,464.  Specification of Letters Patent.  Patented Nov. 5, 1912.

Application filed June 5, 1911. Serial No. 631,350.

*To all whom it may concern:*

Be it known that we, AMANDUS C. ROESSLER, a subject of the King of Great Britain and Ireland, formerly of London, England, and now a resident of Mineola, Nassau county, and State of New York, and WILLIAM A. ARMINGTON, a citizen of the United States, and a resident of the borough of Brooklyn, county of Kings, city and State of New York, have invented certain new and useful Improvements in Combined High and Low Pressure Gas-Lamps, of which the following is a specification.

The lamp of the present invention is designed particularly for those systems wherein either gas or air is fed to the burner at high pressure, and the air and the gas are combined at the burner to provide the proper mixture. Usually, in what is known as the "pressure-gas" system, the air is fed to the burner under high pressure and the gas is fed to the burner under the comparatively low service pressure, the two being mixed at the burner in the proper proportions. A trouble with these systems heretofore has been that if for any reason the compressing plant should fail and the high pressure flow cease, the lamp would be rendered useless. This is so because the parts are arranged so that a definite mixture of air and gas will be obtained when one of the fluids is fed under high pressure and as soon as the high pressure flow ceases it then becomes impossible to secure the right proportions to provide a proper mixture.

The principal object of our invention is to overcome this objection and to provide a practical lamp which may be used as well either at high or at low pressure.

Accordingly our invention consists in feeding air and gas, one of these being fed under high pressure, to the burner, in such proportions as to form a proper mixture, and in providing means for supplying air and gas to the burner in substantially the same proportions even when the high pressure flow ceases.

In a preferred construction, the air is fed under high pressure, and the gas under ordinary service pressure, the two being fed to the burner through certain passages, and, in case of failure of the compressing plant or the high pressure flow ceases, the gas is directed through an independent passage which is of the proper size and is so arranged as to draw in the necessary amount of air to produce a proper mixture.

Specifically the air and the gas passages are preferably arranged on converging lines so that the two jets discharging into a suitable mixing chamber will unite and form a single stream, and the independent passage is preferably disposed between the converging passages and arranged so as to discharge centrally into the mixing chamber. By means of this central disposition of the independent passage, the inflowing jet of gas may be utilized to draw in the necessary amount of air. This air may be taken in through inlet ports in the mixing chamber, and a shutter or shutters may be provided for controlling these ports. A valve may be used for controlling the independent passage, and preferably connections are provided between this valve and the shutter or shutters whereby when the valve is turned to open flow through the independent passage, the shutter or shutters will be opened to admit the necessary amount of air to provide a proper mixture.

Other features of our invention consist of means for preheating the mixture before it reaches the mantle of the burner; means for warming the surrounding air before it comes in contact with the mantle, so as not to chill the flame; and means for keeping the burner adjacent to the mixing chamber relatively cool.

Various other objects and features of the invention will appear as the specification proceeds.

In the accompanying drawings we have illustrated several preferred embodiments of our invention but we would have it understood that various changes and modifications may be made therein without departing from the true scope and spirit of the invention.

In the drawings: Figure 1 is a longitudinal sectional view of a lamp embodying our invention, as designed for use in a "pressure-gas" system. Fig. 2 is a broken detail view of the valve mechanism of the same. Fig. 3 is a sectional view of a slightly modified form of the lamp shown in Fig. 1. Fig. 4 is a sectional view illustrating the adaptation of the invention to a system wherein the gas, instead of the air, is the fluid which is fed under high pressure.

Like reference characters have been used throughout the several views to indicate corresponding parts.

In accordance with the preferred embodiment illustrated in Fig. 1, the lamp consists in the main of a burner tube 1, carrying a mantle 2 at its lower end and having a mixing chamber 3 at its upper end. The air under pressure is delivered into the mixing chamber through a passage 4, and the gas through a passage 5, the two passages preferably being arranged on converging lines, as shown, so as to discharge jets of air and gas into the central portion of the mixing chamber, where such jets unite in a single stream and flow to the burner. The passages for the air and gas are preferably formed in a head 6 which may be attached direct to the mixing chamber, as shown, and for the purpose of adjusting the relative flow of air and gas, means such as the needle valve 7 may be placed in each of these passages. A funnel-shaped nozzle or spout 8 may be placed in the mixing chamber to assist in the mixing of the air and gas and to direct the mixture centrally into the burner tube. The mixing chamber is preferably provided with openings 9 in the sides or in the top thereof, (or in both the sides and top, as shown) to admit if necessary a certain amount of free air to the burner tube, substantially in the nature of a "Bunsen burner." For the purpose of adjusting this supply of free air to the mixing chamber, shutters 10 and 11 may be provided to regulate the extent of the openings in the top and sides of the mixing chamber respectively. When operating normally as a high pressure burner, the shutter 11 is closed and the shutter 10 is adjusted to admit more or less free air. The gas is fed through a pipe 12 and the air is fed through a pipe 13, which pipes may be connected direct to the head, substantially as illustrated.

In the operation of that form of the invention shown in Figs. 1 and 2, wherein the air is the fluid which is fed under high pressure and the gas is simply fed under the ordinary service pressure, the passages are adjusted so as to pass just the required amount of air and gas to produce a proper mixture. In practice the proportion of air and gas is usually about equal. The injector action of the air under high pressure may draw in somewhat more gas than would ordinarily flow through the gas passage, but the passages are adjusted to take care of this. Now if, for any reason, the high pressure flow should cease, as for instance on account of failure of any kind in the compression system, it will be evident that the proper mixture will no longer be formed, for there will be insufficient air to mix with the gas. Imperfect combustion will therefore result, and if no other means were provided, the lamp would be rendered useless. To permit of the lamp being operated even when the high pressure system is out of commission, we provide means for enabling a proper mixture of the air and gas in the right proportions at low pressure. Means for accomplishing this purpose is preferably in the form of an independent passage 14 for the gas which is preferably so disposed between the two converging passages as to discharge centrally into the mixing chamber. A jet of gas entering through this central passage, even though at low pressure, will serve to draw in sufficient air through the openings in the mixing chamber to produce a proper mixture. The relative sizes of the independent passage 14 and the air inlet openings in the mixing chamber will be proportioned to properly accomplish this result. For the purpose of controlling the use of this independent gas passage, we provide some means such as the valve 15, having an opening 16 therein, which, when brought into register with the passage 14, will permit flow of the gas through such passage, and having a cut-away portion 17 which, when the valve is in its normal position, as in Fig. 1, permits flow of gas from the gas pipe 12 through a short connecting passage 18 into the angularly disposed passage 5.

Ordinarily, when the lamp is in use with the high pressure system, the valve 15 is turned, as indicated in Fig. 1, to direct the gas into the angular passage 5. The streams of gas and air issuing from the converging passages unite and mingle in the mixing chamber, passing on down to the burner. In case of failure of any sort in the source of air supply, the valve 15 is simply turned to bring the opening 16 therein into register with the direct gas passage 14, then the gas under service pressure will flow through the direct passage 14 into the mixing chamber, taking up with it the necessary amount of air through the free air openings 9 in the mixing chamber and passing on to the burner. When the lamp is thus operating under low pressure, the shutters 10 and 11 on both the top and the sides of the mixing chamber will preferably be opened fully so as to admit the needed supply of air to the mixing chamber. The adjustment of these shutters when converting the lamp from a high pressure to a low pressure burner, or vice versa, may be accomplished by providing connections between the valve 15 and the shutters. These connections may, as illustrated in Fig. 2, be in the form of an arm 19 which extends down from the valve and is connected at its lower end to the lugs 20 on the shutters.

The principle of using the lamp as either a high pressure or a low pressure burner may be carried out in various other ways.

A by-pass 21 may be led off from the gas pipe down into close proximity with the mantle so as to act as a pilot for igniting the gas when the flow is turned on to the burner. The valve 22 may, if desired, be provided for controlling the pilot.

To provide for more even combustion at the mantle and to cause the combustion to take place at the surface of the mantle so as to gain the greatest amount of light, we preferably locate a deflector 23 in the mouth of the burner tube to direct the gases against the inner walls of the mantle. This deflector may be made in a number of forms. It is, however, preferably made of solid metal, substantially conical in shape, with the pointed end thereof extending up into the burner tube and the lower end thereof supported concentrically within the mouth of the tube to provide an annular passage-way 24 for the outflow of the gaseous mixture. The deflector may be supported in different ways. For instance, as shown in Fig. 1, the pointed end 25 of the deflector may be carried by a supporting ring 26, the body of the deflector being screwed up into the central portion of the ring, after the ring has been placed in position. A convenient method of assembling these parts is to provide the lower end of the burner tube with a separable section 27, between which and the main portion of the tube, the supporting ring is secured. The annular passage-way 24 for the issuing gas may be arranged on flaring lines, as illustrated in Fig. 3, so as to direct the gas more closely against the inner walls of the mantle.

The lower or head end of the burner tube is preferably provided with an enlargement or heating chamber 30 therein to preliminarily heat the mixture before it reaches the mantle. The walls of this heating chamber may be thickened, as indicated at 31, so as to impart the more heat to the mixture. The upper end of the deflector preferably extends up into the enlargement or heating chamber, substantially as shown.

To protect the mantle from drafts and to prevent chilling of the flame at the mantle, we preferably provide some means for warming the surrounding air before it can come in contact with the mantle. This result we accomplish preferably by providing an inner globe 37 and an outer globe 38, and passing the current of air between these globes before it can come in contact with the mantle. The means for directing the incoming current of air may vary, but in the present instance the same consists of a lamp casing 39 which may be supported by brackets or radial supporting arms 40 from the burner tube, which casing has openings 41 in the same to permit the outside air to flow into a chamber 42 within the casing, thence through openings 43 between the globes, and through opening 44 in the inner globe, up into contact with the mantle. The lower wall of the chamber 42 may be and preferably is in the form of an annular reflector 45, from which the inner globe may be suspended by suitable brackets or clamps 46. An annular space 47 is preferably provided between the inner edge of the reflector 45 and the mantle, to allow for the circulation of air around the mantle. The upper wall of the annular chamber 42 may be provided by an inclined partition 48 which in combination with the outwardly flaring flange 56 on the burner tube, furnishes an annular passage to direct the rising current of air from the mantle upwardly and outwardly. There is also preferably provided an outer annular reflector 49.

On account of their lightness, it is a rather difficult matter to force gases downward to any considerable extent, and this difficulty naturally increases as the gases become heated. It is therefore desirable to keep the downwardly flowing gases just as cool as possible until just within reach of the mantle. For this reason we preferably provide means for cooling the upper or inlet end of the burner tube. This means may simply be in the form of an inverted conical-shaped deflector 50 surrounding the burner tube, and which may be actually carried by said tube. In addition to this, however, we preferably provide a pair of spaced upper and lower flanges 51 and 52 respectively. The upper of these flanges may be secured to the burner tube adjacent the mixing chamber by means of a clamping ring 53, and the lower flange may be supported in spaced relation to the upper flange by means of securing screws 54. The inner edge of the lower flange is preferably spaced from the burner tube to provide a concentric passage 55 between said inner edge and the tube. The action of these parts is as follows: The air above the deflector 50 becomes somewhat warmed and flows upward through the annular passage 55 between the burner tube and the inner edge of the lower flange, thence laterally in the space between the two flanges. This creates a circulation of air in contact with the burner tube and hence tends to keep the upper portion of the burner tube cool at all times.

A very simple and convenient method of assembling the various parts is to make the burner head separate from the burner tube and to join the two parts together by a screw-threaded joint 56'. This burner head may also be utilized as the means for securing the lamp casing upon the burner tube. For this purpose the burner tube may be provided with an annular shoulder or abutment 57 against which the sleeve or collar portion 58 surrounding the burner tube and which carries the radial arms 40, may be clamped. The deflector 50 may also be secured in position upon the burner tube by being clamped against the annular abutment 57, substantially as shown.

In the form of the invention illustrated in Fig. 3, the conical deflector in the end of the burner tube is shown as occupying a considerable portion of the heating chamber so that it will in this way prevent the gaseous mixture from expanding within the chamber and losing momentum. Several advantages are secured by making the deflector of a substantial size, for by doing so, more heat is imparted to the mixture since it is caused to flow in a restricted space between two heated surfaces, a better and more intimate mixture is produced, and added velocity is given to the flow since the annular space is a constantly decreasing one. Also in Fig. 3 the mixing chamber is made in a slightly different form. Here the lower conical wall of the mixing chamber is formed by a single member, a collar 60, which is simply screwed on the upper end of the burner tube.

As previously set forth, the invention may also be adapted to a system wherein the gas, instead of the air, is the fluid which is fed under high pressure. An exemplification of this is shown in Fig. 4. In this case the gas is fed to the burner under high pressure (that is under pressure greater than the ordinary service pressure), and the stream of gas entering the mixing chamber 61 through the passage 62 draws in, by its injector action, the necessary amount of air through the air inlet openings 63 in the walls of the mixing chamber. Now if the compression plant should fail and it be necessary to resort to the use of gas at service pressure, the valve 64 would, in the construction shown, be turned to direct the inflowing current of gas under service pressure through an independent passage 65. The passage 62 for the gas under high pressure is necessarily made comparatively small, for otherwise it would pass too much gas. On acount of its comparatively small size, then, it would not pass enough gas at the comparatively low service pressure, and the passage 65 is made sufficiently large to pass sufficient gas at service pressure. When the valve 64 is operated to turn on flow through the independent passage 65, the passage 62 may still be left open, substantially as shown in the drawings. When the device is operating as a low pressure lamp with the gas flowing through the passage 65 (and through the passage 62 if the valve be arranged to permit flow through such passage at that time) the air inlet openings 63 may or may not be adjusted to provide the proper proportion of air, as found necessary. But ordinarily the free air inlet openings in the mixing chamber will be adjusted simultaneously with the changing from a high to a low pressure lamp for the purpose of providing a proper mixture, in the manner of the first form of the invention wherein the air is the fluid under pressure. And the means of connection between the valve mechanism and the air-controlling shutter or shutters may be the same as shown in the first two figures.

What is claimed, is:

1. In combination, a burner, converging gas and air passages for conducting gas, and air under pressure to said burner, a direct gas passage disposed between the converging passages, and means controlling flow through either of the gas passages.

2. In combination, a mixing chamber having air ports therein, a passage for supplying air under pressure to the mixing chamber, a passage for supplying gas to mingle with the jet of air under pressure, an independent passage for supplying gas under service pressure to the mixing chamber, and means for simultaneously directing the gas through the independent passage and opening up the air ports in the mixing chamber.

3. In combination, a mixing chamber having air ports therein, a passage for supplying air under pressure to the mixing chamber, a passage for supplying gas to mingle with the jet of air under pressure, an independent passage for supplying gas under service pressure to the mixing chamber, a valve for directing the gas through the independent passage, and means operated by the movement of said valve to simultaneously open the air ports in the mixing chamber.

4. In combination, a Bunsen tube having air inlet openings therein, a shutter controlling the extent of said openings, passages for supplying gas, and air under pressure to the Bunsen tube, an independent passage for supplying gas to the Bunsen tube, a valve controlling said independent passage, and connections between said valve and the shutter for causing simultaneous operation of said parts.

5. In a gas lamp, a mixing chamber having air ports therein, converging gas and air passages for conducting gas, and air under pressure to said burner, a direct gas passage disposed between the converging passages, and means for simultaneously directing the gas through the direct gas passage and opening up the air ports in the mixing chamber.

6. In a combined high and low pressure gas lamp, the combination with a burner tube, of a mixing chamber communicating therewith, the said mixing chamber having air ports therein, a shutter controlling said air ports, a passage for supplying air under pressure to the mixing chamber, a passage for supplying gas to the mixing chamber to mix with the jet of air under pressure, an additional gas passage located between the other two passages for supplying gas under service pressure to the mixing chamber, and means for simultaneously directing the gas through the additional gas passage and operating the shutter controlling admission of air to the mixing chamber.

7. In a combined high and low pressure gas lamp, a burner tube, a mixing chamber communicating therewith and provided with air ports in the top and sides thereof, a passage for supplying air under pressure to the mixing chamber, a passage for supplying gas to the mixing chamber to mix with the jet of air under pressure, an additional gas passage disposed between the other two passages for supplying gas under service pressure to the mixing chamber, a shutter controlling the air ports in the side of the mixing chamber, normally in closed position when the lamp is operating as a high pressure lamp, a shutter controlling the air ports in the top of the mixing chamber, normally open more or less to admit a percentage of free air when the lamp is operating as a high pressure lamp, and means for simultaneously directing the gas through the additional gas passage and opening the air shutters to admit more free air to the mixing chamber.

8. In a combined high and low pressure gas lamp, a burner tube, a mixing chamber communicating therewith provided with two free air inlets, an injector funnel extending down into the mixing chamber and arranged so that the air from one inlet will pass through the funnel and the air from the other inlet will pass through the mixing chamber on the outside of the funnel, a passage for directing air under pressure into the funnel, a passage for directing gas into the funnel to mingle with the stream of air under pressure, means for closing the outer air inlet in the mixing chamber when the lamp is operating as a high pressure lamp, an independent passage for directing gas under service pressure into the funnel, and means for simultaneously directing gas through the independent gas passage and opening up the outer air inlet in the mixing chamber.

9. In a combined high and low pressure gas lamp, a burner tube, a mixing chamber communicating therewith provided with air inlet ports in the top and sides thereof, an injector funnel extending down into the mixing chamber and separating the air inlets in the top of the mixing chamber from the air inlets in the sides thereof, shutters controlling the respective air inlets, a passage for directing air under pressure into the injector funnel, a passage for supplying gas into the funnel to mingle with the stream of air under pressure, an independent passage for supplying gas at service pressure to the funnel, and means for simultaneously controlling the flow of gas to the independent gas passage and operating the shutters controlling the air inlets.

10. In a combined high and low pressure gas lamp, a burner tube, a mixing chamber communicating therewith provided with air inlet ports in the top and sides thereof, an injector extending down into the mixing chamber and separating the air inlets in the top of the mixing chamber from the air inlets in the sides thereof, shutters controlling the respective air inlets, a passage for directing air under pressure into the injector funnel, a passage for supplying gas into the funnel to mingle with the stream of air under pressure, an independent passage for supplying gas at service pressure to the funnel, valve mechanism controlling flow of the gas to either the independent gas passage or the first-mentioned gas passage, and operative connection between said valve mechanism and the shutters aforesaid.

11. In a combined high and low pressure gas lamp, a burner tube, a mixing chamber communicating therewith provided with free air inlets, an injector funnel extending down into the mixing chamber, a passage for supplying air under pressure to the mixing chamber, a passage for supplying gas to mingle with the jet of air under pressure, an independent passage for supplying gas under service pressure to the mixing chamber, and means for simultaneously directing the gas through the independent gas passage and opening up the air inlets in the mixing chamber.

12. A combined high and low pressure gas lamp having fluid passages designed for use respectively when the lamp is operating as a high or low pressure lamp, a mixing chamber into which the passages discharge, said mixing chamber having free air inlets therein, and means for simultaneously controlling flow through the respective passages and admission of air through the free air inlets.

13. A combined high and low pressure gas lamp having fluid passages designed for use respectively when the lamp is operating as a high or low pressure lamp, a mixing chamber into which the passages discharge, said mixing chamber having free air inlets therein, a shutter controlling said free air inlets, valve mechanism controlling flow through the high and low pressure passages, and connections from said valve mechanism for operating the air-controlling shutter simultaneously with the operation of the valve mechanism.

Signed at New York city in the county of New York and State of New York this 17th day of May A. D. 1911.

AMANDUS C. ROESSLER.
WILLIAM A. ARMINGTON.

Witnesses:
JEANNETTE STORK,
PHILIP S. McLEAN.

Copies of this patent may be obtained for five cents each, by addressing the "Commissioner of Patents, Washington, D. C."